US007956322B2

(12) United States Patent
Sugiyama et al.

(10) Patent No.: US 7,956,322 B2
(45) Date of Patent: Jun. 7, 2011

(54) MASS SPECTROMETER AND MASS SPECTROMETRIC ANALYSIS METHOD

(75) Inventors: Masuyuki Sugiyama, Kokubunji (JP); Yuichiro Hashimoto, Tachikawa (JP); Hideki Hasegawa, Tachikawa (JP); Yasuaki Takada, Kiyose (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 12/354,245

(22) Filed: Jan. 15, 2009

(65) Prior Publication Data

US 2009/0179149 A1 Jul. 16, 2009

(30) Foreign Application Priority Data

Jan. 16, 2008 (JP) ................................ 2008-006372

(51) Int. Cl.
*B01D 59/44* (2006.01)
*H01J 49/00* (2006.01)

(52) U.S. Cl. ........ 250/282; 250/281; 250/283; 250/287; 250/288; 250/290; 250/291; 250/292; 250/299

(58) Field of Classification Search .......... 250/281–283, 250/287–288, 290–292, 299
See application file for complete search history.

(56) References Cited

U.S. PATENT DOCUMENTS

| | | | | |
|---|---|---|---|---|
| 5,464,985 | A | 11/1995 | Cornish et al. | |
| 6,504,148 | B1 | 1/2003 | Hager | |
| 6,507,019 | B2 | 1/2003 | Chernushevich et al. | |
| 7,078,685 | B2 * | 7/2006 | Takada et al. | 250/292 |
| 7,348,554 | B2 * | 3/2008 | Hashimoto et al. | 250/292 |
| 7,569,814 | B2 * | 8/2009 | Hashimoto et al. | 250/282 |

OTHER PUBLICATIONS

Donald F. Hunt, et al. "Sequence Analysis of Polypeptides by Collision Activated Dissocation on a Triple Quadrupole Mass Spectrometer", Biomedical Mass Spectrometry Magazine, vol. 8, No. 9, pp. 397, 1981.

Howard R. Morris, et al, "High Sensitivity Collisionally-activated Decomposition Tandem Mass Spectrometry on a Novel Quadrupole/Orthogonal-acceleration Time-of-flight Mass Spectrometer", Rapid Communications in Mass Spectometry Magazine, vol. 10, pp. 889-866, 1996.

* cited by examiner

*Primary Examiner* — Robert Kim
*Assistant Examiner* — Meenakshi S Sahu
(74) *Attorney, Agent, or Firm* — Mattingly & Malur, P.C.

(57) ABSTRACT

An MS/MS spectrometric analysis method obtains throughput and mass resolving power of precursor ions. In a mass spectrometer, ions, which are introduced and accumulated in an ion trap unit, are resonance-extracted mass-selectively. A profile of precursor ions at the m/z axis of the ion trap and a profile at the mass analyzer portion, which performs mass analysis of the ions extracted from a collision induced dissociation portion, is obtained by performing a measurement when the injection energy to the collision induced dissociation portion is low, and when the injection energy to the collision induced dissociation portion is high. The profile at the m/z axis of the ion trap of the obtained two-dimensional spectrum is substituted with the profile at the m/z axis of the mass analyzer portion. In this way, the m/z of both the precursor ions and the fragment ions can be determined with high mass resolving power.

14 Claims, 8 Drawing Sheets

MASS SPECTROMETER AND MASS SPECTROMETRIC ANALYSIS METHOD

CLAIM OF PRIORITY

The present application claims priority from Japanese patent application JP 2008-006372 filed on Jan. 16, 2008, the content of which is hereby incorporated by reference into this application.

FIELD OF THE INVENTION

The present invention relates to a mass spectrometer using an ion trap unit and an operation method thereof.

BACKGROUND OF THE INVENTION

MS/MS analysis is useful for identifying molecular species by acquiring information on a structure of precursor ions from a pattern of fragment ions. Further, the MS/MS analysis has been widely applied to quantitative analysis because an influence of noise caused due to impurities can be avoided. How to perform the above analysis according to the related art will be described below.

A method of performing MS/MS analysis using an ion trap unit is disclosed in U.S. Pat. No. 7,078,685. First, sample ions are introduced into an ion trap unit so as to be trapped. Next, all ions except for specific precursor ions among the trapped ions are ejected outside the trap. Then, the precursor ions remaining in the trap are dissociated by collision induced dissociation and the like, that collides the precursor ions with rare gas. Finally, fragment ions generated at the time of dissociating the precursor ions are extracted mass-selectively.

A method of performing MS/MS analysis using a mass spectrometer having a configuration where a collision induced dissociation portion is inserted between two quadrupole mass filters is disclosed in "Biomedical Mass Spectrometry Magazine, Volume 8, pp. 397 (1981)". The quadruple mass filter in a first stage selectively transmits only specific precursor ions among ions, which are introduced into the mass spectrometer, and ejects all the other ions. Next, a collision induced dissociation portion dissociates the precursor ions by collision induced dissociation and the like, that collides the precursor ions with rare gas. The quadrupole mass filter in a second stage performs a mass analysis of fragment ions generated in the collision induced dissociation portion.

A method of performing MS/MS analysis using a mass spectrometer having a configuration where a collision induced dissociation portion is inserted between a quadrupole mass filter and a time-of-flight mass spectrometer is disclosed in "Rapid Communications in Mass Spectrometry Magazine Volume 10, pp. 889-896 (1996)". The quadruple mass filter selectively transmits only specific precursor ions among ions, which are introduced into the mass spectrometer, and ejects all the other ions. Next, a collision induced dissociation portion dissociates the precursor ions by collision induced dissociation and the like, which collides the precursor ions with rare gas, to generate fragment ions. Then, fragment ions, which are generated by the collision induced dissociation portion, are introduced into the time-of-flight mass spectrometer, which performs mass analysis. This configuration can perform the mass analysis of the fragment ions having higher resolution than the configuration that performs the mass analysis of the fragment ions using the quadrupole mass filter, but is poor in view of the duty cycle.

A method of performing MS/MS analysis using a mass spectrometer having a configuration where a collision induced dissociation portion is inserted between two time-of-flight mass spectrometers is disclosed in U.S. Pat. No. 5,464,985. The time-of-flight mass spectrometer in a first stage performs a mass analysis of ions, which are introduced into the mass spectrometer, and introduces only specific precursor ions into a collision induced dissociation portion and ejects all the other ions. Next, a collision induced dissociation portion dissociates the precursor ions by collision induced dissociation and the like, that collides the precursor ions with rare gas. Then, the time-of-flight mass spectrometer in a second stage performs a mass analysis of fragment ions generated in the collision induced dissociation portion. This configuration can select the precursor ions having higher resolution than the configuration that selects the precursor ions using the quadrupole mass filter.

A method of performing a precursor scan or a neutral loss scan, which is a kind of MS/MS analysis using a mass spectrometer configured with a collision induced dissociation portion inserted between an ion trap unit and a time-of-flight mass spectrometer or between an ion trap unit and a quadrupole mass filter is disclosed in U.S. Pat. Nos. 6,504,148 and 6,507,019. First, ions, which are introduced into the mass spectrometer, are trapped in the ion trap unit. The trapped ions are sequentially extracted from the ion trap unit and then introduced into a collision induced dissociation portion. Next, the collision induced dissociation portion dissociates the precursor ions by collision induced dissociation and the like that collides the precursor ions with rare gas. Then, the time-of-flight mass spectrometer or the quadrupole mass filter performs a mass analysis of fragment ions generated in the collision induced dissociation portion. This configuration increases the duty cycle of the precursor ion scan or the neutral loss scan as compared to a case where the precursor ions are selected by the time-of-flight mass spectrometer or the quadrupole mass filter.

SUMMARY OF THE INVENTION

It is an object of the present invention to perform MS/MS measurement that can determine m/z of both precursor ions and fragment ions with high throughput and high resolution.

The related arts (U.S. Pat. Nos. 7,078,685 and 5,464,985, "Biomedical Mass Spectrometry Magazine, Volume 8, pp. 397 (1981)", and "Rapid Communications in Mass Spectrometry Magazine Volume 10, pp. 889-896 (1996)") eject all ions except for the specific precursor ions in the process of selecting the precursor ions. For this reason, the above-mentioned U.S. Pat. Nos. 7,078,685 and 5,464,985, "Biomedical Mass Spectrometry Magazine, Volume 8, pp. 397 (1981)", and "Rapid Communications in Mass Spectrometry Magazine Volume 10, pp. 889-896 (1996)" have a common problem in that the duty cycle is low. Further, the configurations that perform the mass analysis of the precursor ions using the quadrupole mass filter or the ion trap unit as described in the related arts (U.S. Pat. Nos. 7,078,685, 6,504,148, and 6,507,019, "Biomedical Mass Spectrometry Magazine, Volume 8, pp. 397 (1981)", and "Rapid Communications in Mass Spectrometry Magazine Volume 10, pp. 889-896 (1996)") has a problem in that there is lower mass resolving power than a case where the time-of-flight mass spectrometer and the like performs the mass analysis. However, a method for solving the above problem is not described in the related arts.

A mass spectrometer according to the present invention includes: an ion trap unit that extracts ions within a predetermined mass range; a dissociation unit that dissociates the ions extracted from the ion trap unit; and a mass analyzer portion that performs a mass analysis of the ions extracted from the dissociation unit, in which the ions, which are introduced and accumulated into the ion trap unit, are resonance-extracted mass-selectively. With the present invention, since the ions are stored in the ion trap unit and the ions having a predetermined mass are then sequentially extracted, the loss of the ions is small, making it possible to realize high throughput.

Further, the mass spectrometer of the present invention includes a unit that substitutes a profile of the precursor ions at a m/z axis of the ion trap with a profile of the precursor ions at a m/z axis of the mass analyzer portion in a 2D mass spectrum that is acquired by the measurement, such that the m/z of both the precursor ions and the fragment ions can be determined with high mass resolving power.

The mass analyzer portion performs the measurement under a first condition where the dissociation unit substantially dissociates the precursor ions extracted from the ion trap unit and a second condition different from the first condition, for example, a condition where the precursor ions are not substantially dissociated. When the dissociation unit is a collision induced dissociation portion that dissociates the precursor ions by collision induced dissociation, a pair of the profile of the precursor ions at the m/z axis of the ion trap and the profile of the precursor ions at the m/z axis of the mass analyzer portion is acquired by the measurement under the second condition where injection energy to the collision induced dissociation portion becomes low, for example, the condition where the precursor ions are not substantially dissociated and a pair of the profile of the precursor ions at the m/z axis of the ion trap and the profile of the fragment ions at the m/z axis of the mass analyzer portion is acquired by the measurement under the first condition where the injection energy to the collision induced dissociation portion becomes high, for example, the condition where the precursor ions are substantially dissociated. Thereafter, the profile of the precursor ions at the m/z axis of the ion trap is substituted by the profile of the precursor ions at the m/z axis of the mass analyzer portion. With the above-mentioned method, the m/z of both the precursor ions and the fragment ions can be determined with high mass resolving power.

Also, the mass spectrometer includes a unit that performs the measurement, including the first condition and the second condition and separates a signal of the first condition and a signal of the second condition from the 2D mass spectrum that includes the spectra of the first condition and the spectra of the second condition.

Moreover, the mass spectrometer may use an electron capture dissociation portion instead of the collision induced dissociation portion. In this case, the injection energy of an electron to the electronic capture dissociation unit is controlled.

In addition, with the present invention, the MS/MS measurement can be performed with the high throughput as well as high mass resolving power of both the precursor ions and the fragment ions.

DETAILED DESCRIPTION OF THE PREFERRED EMBODIMENTS

First Embodiment

Figure 1:
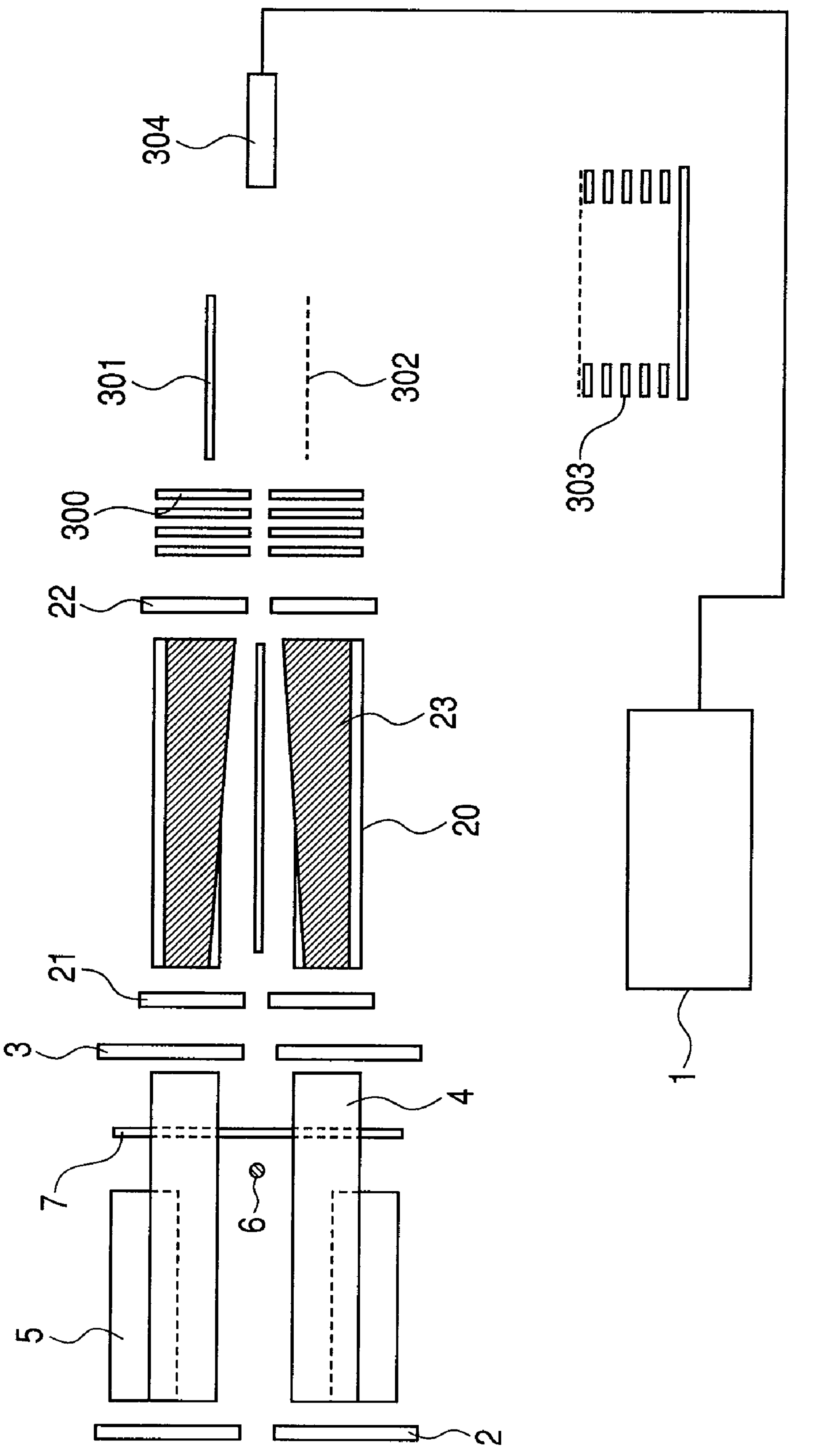
FIG. 1 is a configuration diagram of a first embodiment according to the present invention.

FIG. 1 is a configuration diagram showing a first embodiment of a mass spectrometer according to the present invention. Further, for clarity of illustration, an exhausting apparatus, such as a pump and the like, and an introducing apparatus that introduces buffer gas and the like are omitted. Further, first and second embodiments show a value of DC voltage in the case of measuring positive ions as one example of an application of DC voltage. If a sign of the whole DC voltage is inverted, negative ions can be measured. Also, although a DC offset voltage (0 to 500 V) is applied to an ion trap unit and a collision induced dissociation portion, the first and second embodiments show a value that subtracts the offset voltage from the actually applied voltage with respect to the whole voltage.

Ions, which are generated from an electro spray ionization ion source, an atmospheric pressure chemical ionization ion source, an atmospheric pressure photo ionization ion source, an atmospheric pressure matrix assisted laser ionization ion source, and a matrix assisted laser ionization ion source and the like, are introduced into an ion trap unit.

The ion trap unit includes an inlet lens 2, an exit lens 3, quadrupole rods 4, vane lenses 5 inserted into a gap of the quadrupole rods, a pre wire lens 6, and a rear wire lens 7. An RF voltage whose phase is alternately inverted, which is generated from an RF power supply, is applied to the quadrupole rods 4. Typical voltage amplitude of the RF voltage is about several 100 to 5000 V and a frequency thereof is about 500 kHz to 2 MHz. The buffer gas is introduced into the ion trap unit and is maintained at $10^{-4}$ Torr to $10^{-2}$ Torr ($1.3\times10^{-2}$ Pa to 1.3 Pa).

The measurement is performed in three sequences. An amplitude value of a trap RF voltage is set to about 100 to 1000 V during a trap period. As one example of an applied voltage to other electrodes, the inlet lens 2 is set to about 10 V, the vane lenses 5 about 0 V, the pre wire lens 6 about 20 V, the rear wire lens 7 about 20 V, and the exit lens 3 about 20 V. A radial direction of the quadrupole is formed with pseudo-potential by the trap RF voltage. Further, a center axis direction of the quadrupole field is formed with DC potential by the DC voltage of the inlet lens 2 and the exit lens 3. For this reason, the ion introduced into the ion trap unit is trapped in a region placed among the inlet lens 2, the quadrupole rods 4, the vane lenses 5, and the pre wire lens 6. A length of the trap period is about 1 ms to 1000 ms and significantly depends on the ion amount that is introduced into the ion trap unit.

Ion is resonance-extracted mass-selectively by changing the trap RF voltage amplitude during a mass scan period. At this time, the relationship of the m/z of the extracted ion and the trap RF voltage amplitude V is represented by the following equation.

$$m/z = \frac{4eV}{q_{ej} r_0^2 \Omega^2} \quad \text{[Equation 1]}$$

Herein, $r_0$ is a distance between a quadrupole rod 10 and a center of the quadrupole and Ω is an angular frequency of the trap RF voltage. Further, $q_{ej}$ is a numeral value that can be unambiguously calculated from a ratio of the angular frequency Ω of the trap RF voltage to an angular frequency of supplemental AC ω. The supplemental AC (amplitude 0.01 to 100 V and frequency 10 kHz to 500 kHz) is applied between the vane lenses 5 during the mass scan period. Also, a voltage of about 3 V to 10 V is applied to the trap electrode 6.

Finally, the whole voltage is 0 during an ejection period such that the whole ions are extracted outside the trap. A length of the ejection period is about 0.1 to 10 ms.

The collision induced dissociation portion includes four quadrupole rods, that is, multipole rod 20, a inlet lens 21, a exit lens 22, and a vane lenses 23. A pressure, which introduces buffer gas, such as nitrogen, into the collision induced dissociation portion, is maintained at 5 to 20 mTorr. The collision induced dissociation portion generates the fragment ions by dissociating the precursor ions by colliding the introduced precursor ions with the buffer gas. The potential difference between the offset potential of the ion trap unit and the offset potential of the multipole rod 20 is set to about 20 V to 100 V, making it possible to efficiently generate the collision induced dissociation. The potential difference between the offset potential of the ion trap unit and the offset potential of the multipole rod 20 is set to about 0 to 10 V, such that the precursor ions can be transmitted without being dissociated. Further, acceleration potential in an axial direction is formed on a center axis of the collision induced dissociation portion by applying the DC voltage of 0.5 to 20 V to the vane lenses 23. The ions can efficiently move up to the vicinity of the exit lens 22 due to the acceleration potential. The fragment ions generated by the dissociation and the transmitted precursor ions are introduced into a time-of-flight type mass analyzer portion.

The time-of-flight type mass analyzer portion includes an ion lens 300, a pusher 301, a puller 302, a reflector 303, and a detector 304. The ions, which are introduced into the time-of-flight type mass analyzer portion, are converged by the ion lens 300 configured of a plurality of electrodes and then introduced into an accelerator of the time-of-flight type mass analyzer portion configured of the pusher 301 and the puller 302. The ions are accelerated in a direct direction with respect to the ion introducing direction by applying a voltage of several 100 V to several kV between the pusher 301 and the puller 302 by a power supply for the accelerator. The ions accelerated in the direct direction reach the detector as they are or deflected through the reflection lens called a reflectron and then reach the detector that is configured of MCP and the like. A mass number of the ions can be measured on the basis of a relation of an acceleration start time of the accelerator and a detection time of the ions.

Figure 2:
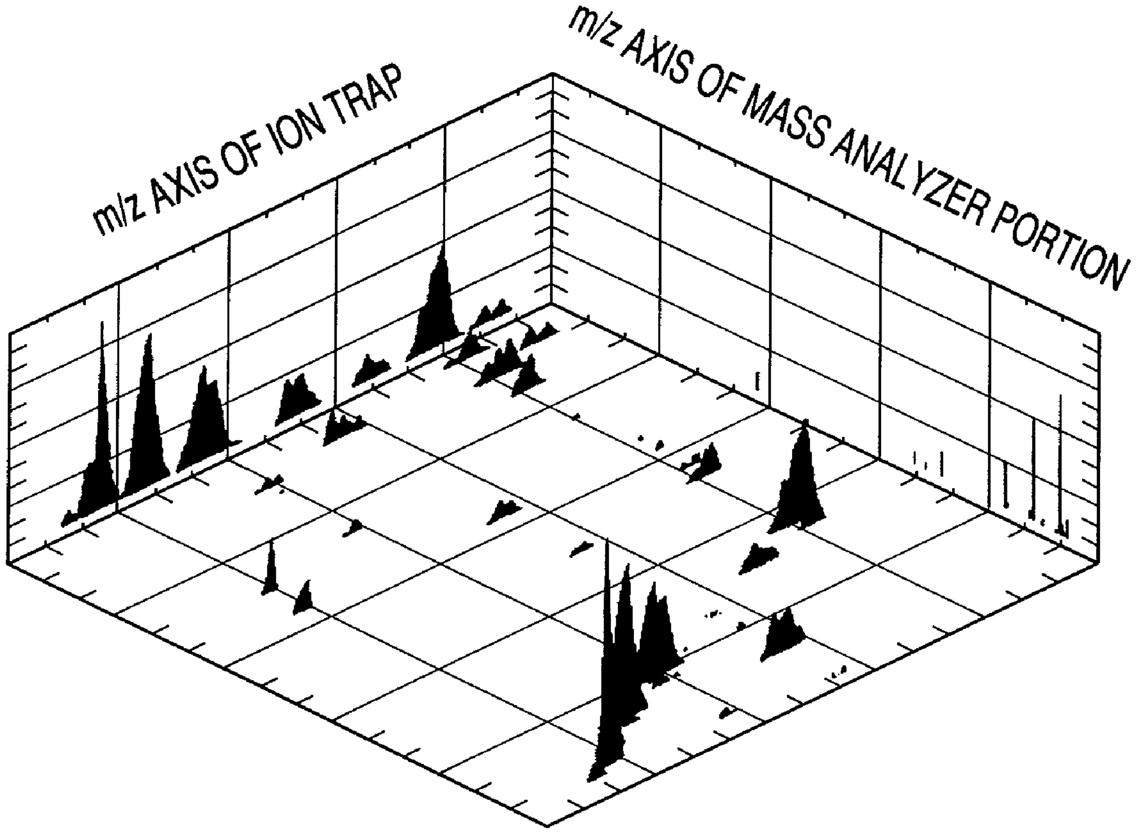
FIG. 2 is a diagram for explaining an effect of the first embodiment according to the present invention.

Plotting ion intensity detected by the detector with respect to a m/z axis x of the ion trap unit and a m/z axis y of the time-of-flight type mass analyzer portion is defined as a 2D mass spectrum. The m/z axis of the ion trap of the 2D mass spectrum corresponds to the m/z of the precursor ions and the m/z axis of the time-of-flight type mass analyzer portion corresponds to the m/z of the fragment ion. FIG. 2 shows one example of the 2D mass spectrum. Further, in FIG. 2, projection components for each m/z axis are plotted on the x and y axes.

Figure 3:
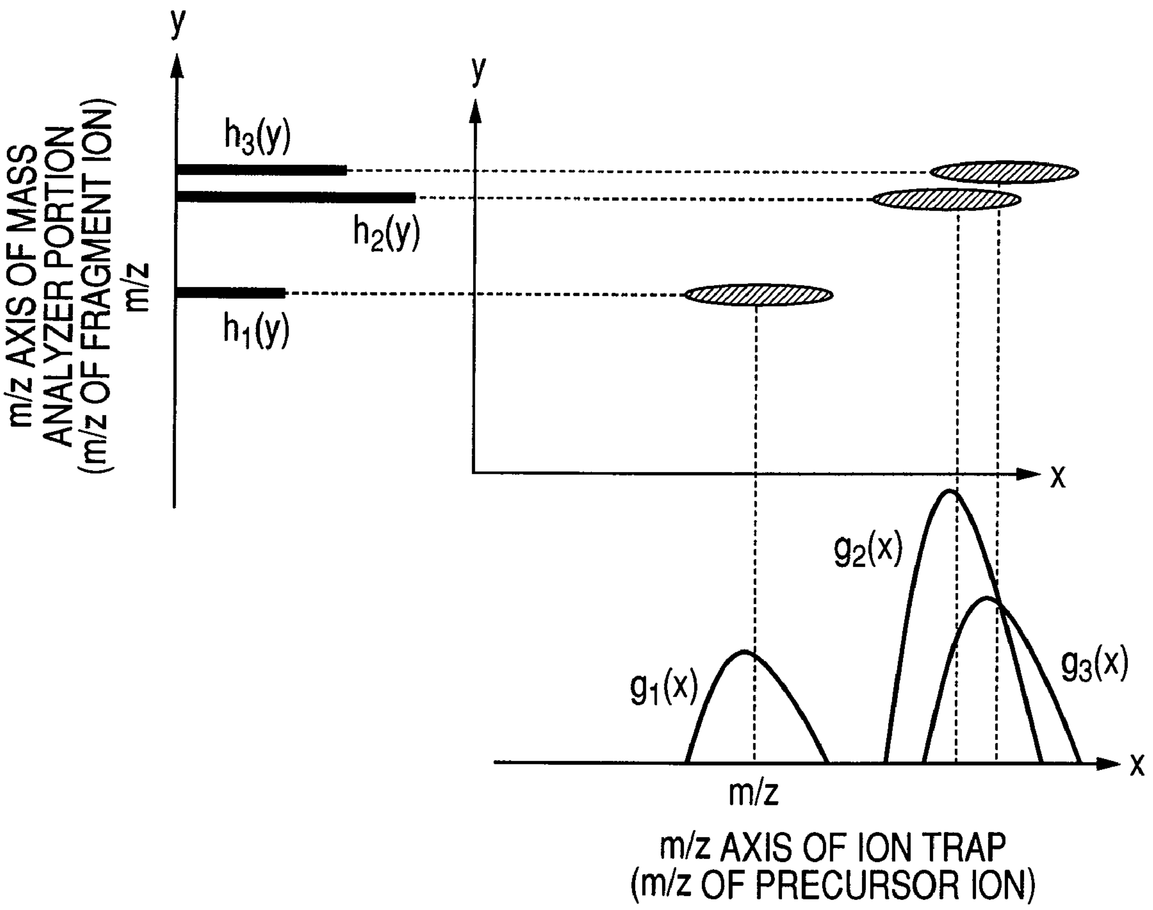
FIG. 3 is a diagram for explaining an effect of the first embodiment according to the present invention.

In the 2D mass spectrum, one spectrum is obtained each time the ion trap unit is scanned once. However, it is integrated about 10 to 500 times per condition. In the first embodiment, the profile of the precursor ions at the m/z axis of the ion trap can be substituted by the profile at the m/z axis of the time-of-flight type mass analyzer portion. Thereby, the m/z of both the precursor ions and the fragment ions can be determined with high mass resolving power (m/Δm 5000 to 60000) of the mass analyzer portion at the time of performing the two-dimensional mass analysis. The detailed method will be described below. The measurement is performed by setting the difference of the offset potential of the ion trap unit and the collision induced dissociation portion to about 0 to about 10 V. It is difficult to perform collision induced dissociation under the condition where injection energy to the collision induced dissociation portion is low and thus, the precursor ions reach the time-of-flight type mass analyzer portion as they are. At this time, a pattern diagram of the 2D mass spectrum viewed from an axis (z-axis) direction of ion intensity is shown in FIG. 3. In FIG. 3, the projection components for each of the x-axis and y-axis are plotted at a lower side of the x-axis and a left side of the y-axis. The m/z axis of the ion trap of the 2D mass spectrum as well as the m/z axis of the time-of-flight type mass analyzer portion corresponds to the mass of the precursor ions. As a result, information on a pair of the profile $g_n(x)$ of the precursor ions at the m/z axis of the ion trap and the profile $h_n(y)$ of the precursor ions at the m/z axis of the time-of-flight type mass analyzer portion is obtained from the 2D mass spectrum measured under the condition where the injection energy is low.

Figure 4:
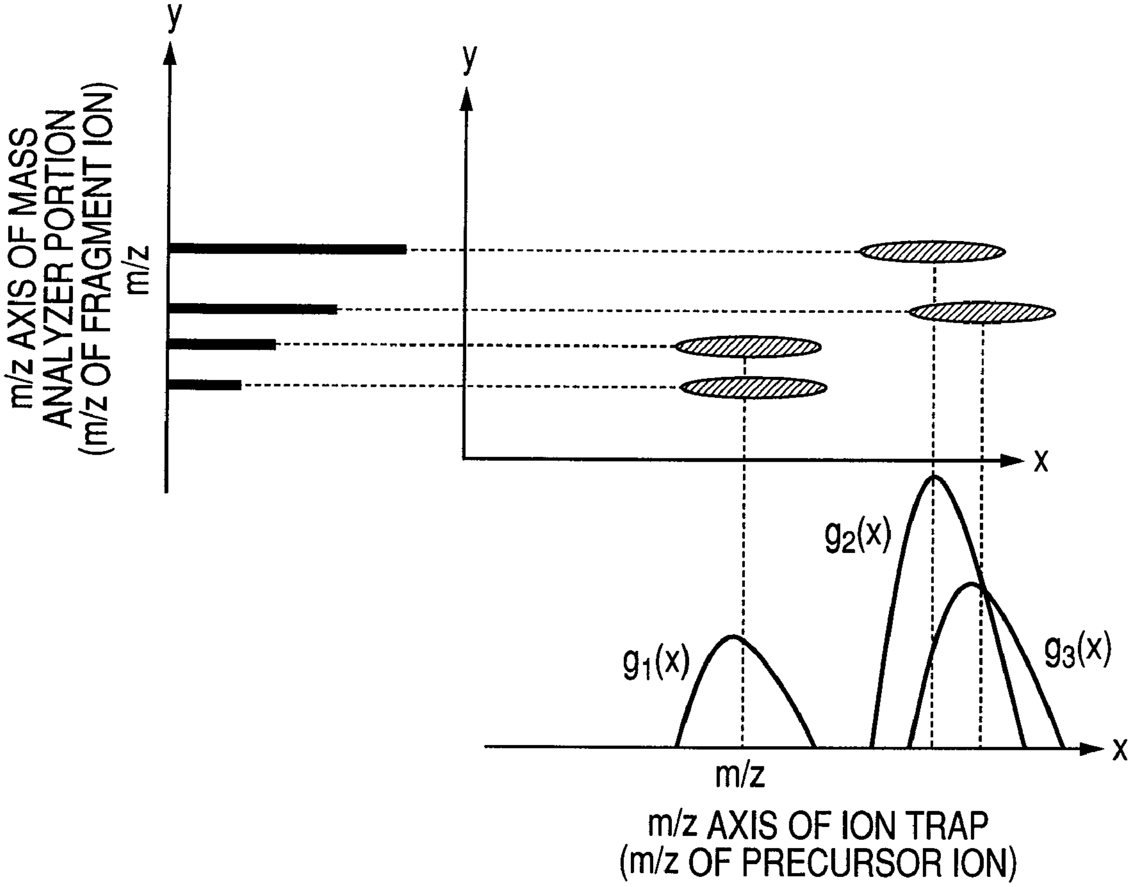
FIG. 4 is a diagram for explaining an effect of the first embodiment according to the present invention.

The measurement is performed by setting the difference of the offset potential of the ion trap unit and the collision induced dissociation portion to about 20 V to about 100 V. The precursor ions dissociated under the condition where the injection energy to the collision induced dissociation portion is high, thereby generating the fragment ions. At this time, a pattern diagram of the 2D mass spectrum viewed from an axis (z-axis) direction of ion intensity is shown in FIG. 4. In FIG. 4, the projection components to each of the x-axis and y-axis are plotted at a lower side of the x-axis and a left side of the y-axis. The m/z axis of the ion trap of the 2D mass spectrum corresponds to the m/z of the precursor ions and the m/z axis of the time-of-flight type mass analyzer portion corresponds to the m/z of the fragment ion. The difference of the offset potential of the ion trap unit and the collision induced dissociation portion is controlled so as to be able to optimize the injection energy to the collision induced dissociation portion, thereby efficiently generating the fragment ions, which are the object to be measured. Further, when the optimal injection energy for every ion is different, the measurement on all of the ions can be performed by measuring the two-dimensional mass analysis many times by varying the injection energy to the collision induced dissociation portion.

For each of the precursor ions (1, 2, . . . , n) among the 2D mass spectrum A (x, y) acquired under the condition where it is difficult to generate the dissociation of the precursor ions of FIG. 3, a list of the pair of the profile $g_n(x)$ at the m/z axis of the ion trap and the profile $h_n(y)$ at the m/z axis of the time-of-flight type mass analyzer portion is acquired. Herein, the precursor ions that acquire the profile and have the ion signal strength exceeding a predetermined threshold value may be automatically selected and the precursor ions may be selected by previously and manually inputting the list of the m/z of the precursor ion, which is the object to be measured. Also, g(x) and h(y) are normalized as follows.

$$\int g(x)dx = 1$$

$$\int h(x)dx = 1$$

Next, the strength of each of the fragment ions in the 2D mass spectrum B (x, y) measured under the condition where the precursor ions of FIG. 4 are dissociated is extracted as a function $B_n^*(y)$ of an axis of the time-of-flight type mass analyzer portion. At this time, the strength of the fragment ions is calculated by using the information on the profile $g_n(x)$ of the precursor ions n at the m/z axis of the ion trap existing in the list as represented by the following equation.

$$\int_x B(x,y)g_n(x)dx = B_n^*(y) \qquad \text{[Equation 2]}$$

Figure 6A:
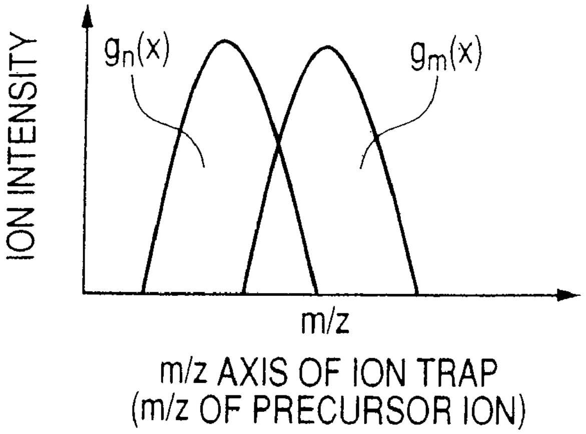
FIGS. 6A-C are diagrams for explaining an effect of the first embodiment according to the present invention.

At this time, when there are precursor ions approaching the m/z and the profiles $g_n(x)$ and $g_m(x)$ overlap at the m/z axis of the ion trap (FIG. 6A), the profile of the fragment ions at the m/z axis of the ion trap is fitted at a sum of the $g_n(x)$ and $g_m(x)$ so that it is reproduced, thereby determining the following.

$$B_n^*(y)$$

$$B_m^*(y)$$

Figure 6B:
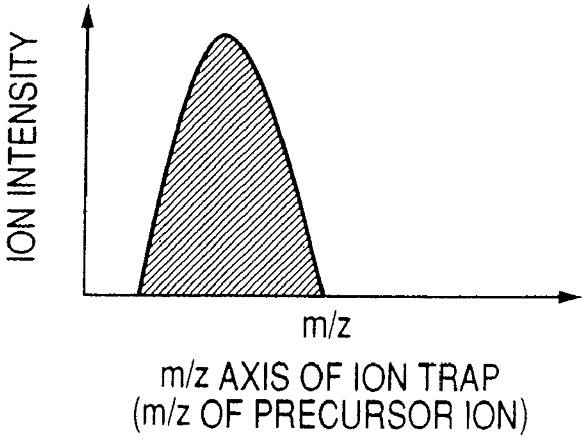

For example, as shown in FIG. 6B, when the profile of the fragment ions having an area strength S at $m/z=y_1$ at the m/z axis of the ion trap is fitted at $ag_n(x)+b\ g_m(x)$ (wherein, a=1 and b=0), then $$B_n^*(y_1)=S$$

$$B_m^*(y_1)=0$$

Figure 6C:
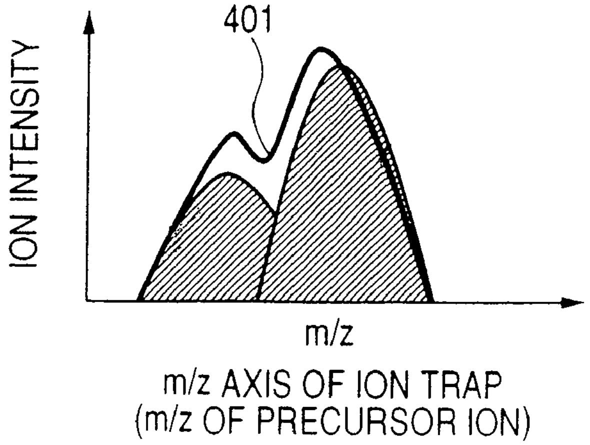

Further, as shown in FIG. 6C, when the profile 401 of the fragment ions having an area strength $S_2$ at $m/z=y_2$ at the m/z axis of the ion trap is fitted at $ag_n(x)+b\ g_m(x)$ (wherein, b=0.7 and a=0.3), then $$B_n^*(y_2)=0.3S_2$$

$$B_m^*(y_2)=0.7S_2$$

When the profile has more than three overlapping precursor ions at the m/z axis of the ion trap, the above same fitting is performed on the profile to separate each of the precursor ions.

Figure 5:
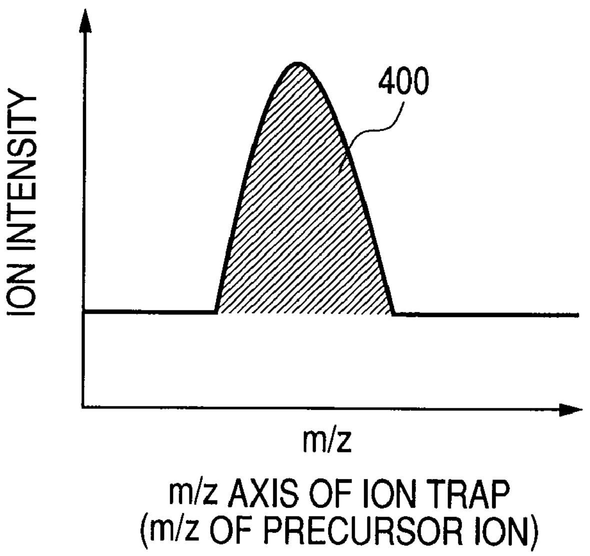
FIG. 5 is a diagram for explaining an effect of the first embodiment according to the present invention.

Further, when the extraction of the strength of the fragment ions is performed, S/N can be improved by removing the components of the profile different from g(x). For example, as shown in FIG. 5, when a signal 400 (a portion shown by an oblique line in FIG. 5) depending on the m/z of the m/z axis of the ion trap is observed on background components, which does not depend on the m/z of the m/z axis of the ion trap, only the components meeting g(x) is taken out, such that the influence of the background component can be removed.

At this time, instead of calculating the strength of the fragment ions using the profile $g_n(x)$ at the m/z axis of the ion trap, the height of each of the fragment ion peaks can be used. In this case, even though the calculation amount can be reduced, the precision of the ion intensity of the 2D mass spectrum is degraded.

Next, if a product is performed on $B_n^*(y)$ and $h_n(x)$, a spectrum where the profile of the precursor ions n at the m/z axis of the ion trap is substituted by the profile at the m/z axis of the mass analyzer portion is obtained.

$$B_n^*(y) \otimes h_n(x) = B_n^{**}(x,y) \qquad \text{[Equation 3]}$$

Figure 7:
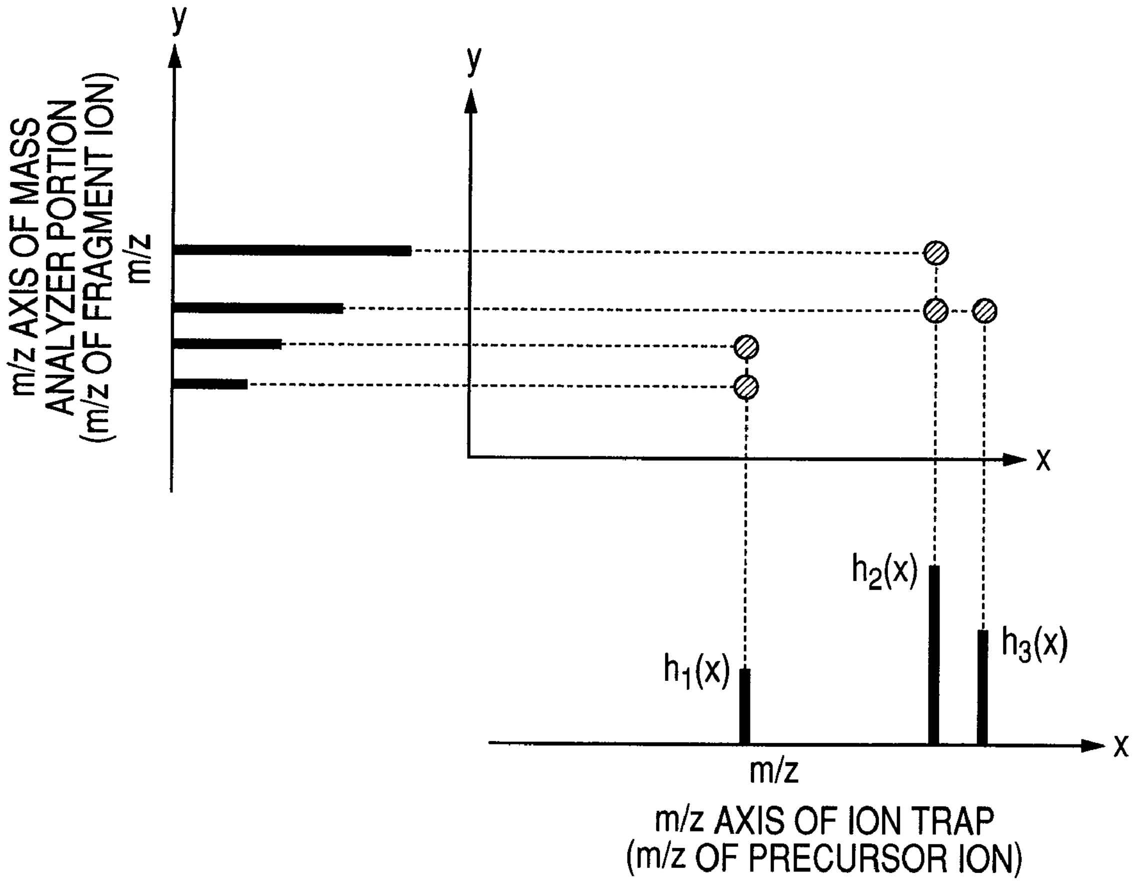
FIG. 7 is a diagram for explaining an effect of the first embodiment according to the present invention.
Figure 8:
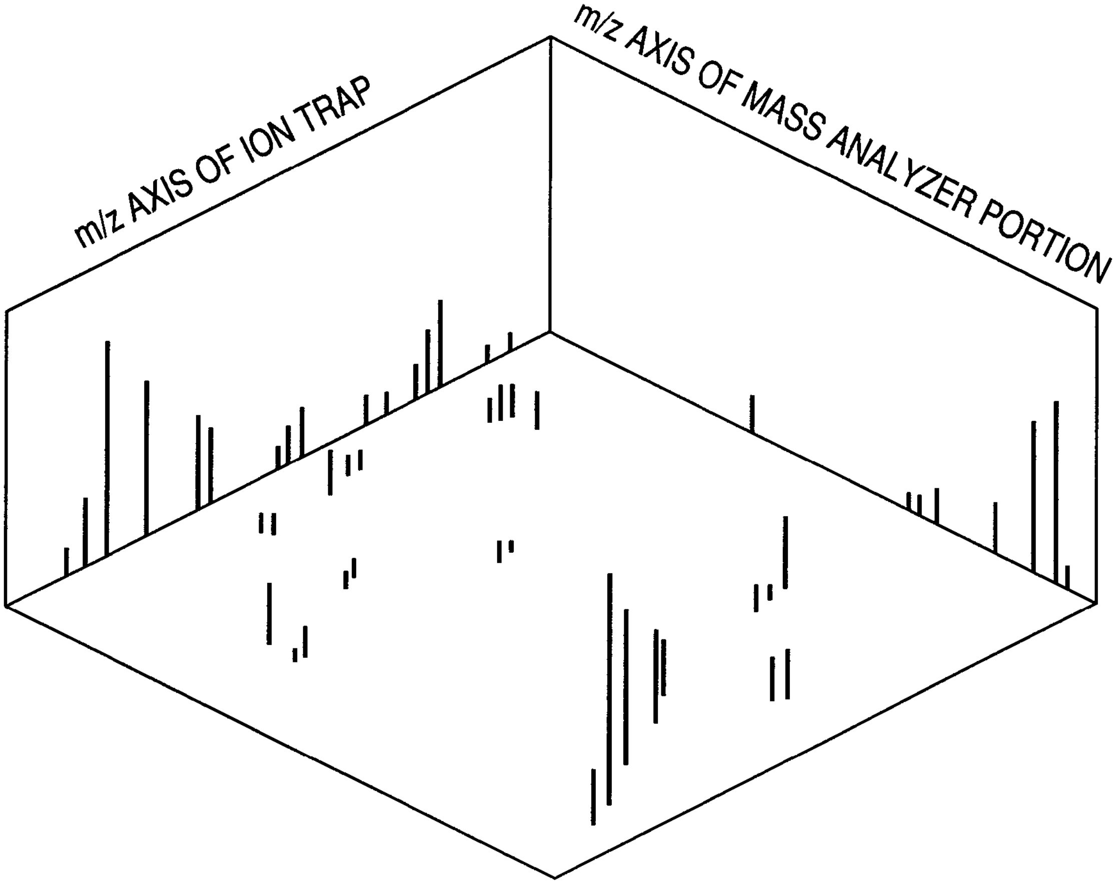
FIG. 8 is a diagram for explaining an effect of the first embodiment according to the present invention.

For each of the precursor ions n, $B_n^{}(x, y)$ is obtained and if the all of the precursor ions are summed, the 2D mass spectrum where the profile at the m/z axis of the ion trap is substituted by the profile at the m/z axis of the mass analyzer portion is obtained. At this time, a pattern diagram of the 2D mass spectrum viewed from the axis (z-axis) direction of the ion intensity is shown in FIG. 7. In FIG. 7, the projection components for each of the x-axis and y-axis are plotted at a lower side of the x-axis and a left side of the y-axis. By the above-mentioned method, the 2D mass spectrum with the high mass resolving power of both the precursor ions and the fragment ions can be obtained. One example of the 2D mass spectrum after the method according the first embodiment is performed is shown in FIG. 8. Further, the projection components to each of the mass axes are plotted on the x and y axes in FIG. 8**.

The 2D mass spectrum includes information on a precursor ion scan, a neutral loss scan, and a product ion scan. By performing the method according to the first embodiment, the mass resolving power of the precursor ion scan can be improved as well as the contribution of the fragment ions derived from other precursor ions due to the neutral loss scan can be removed.

Further, the 2D mass spectrum for every dissociation energy is acquired by varying the dissociation energy by scanning the injection energy to the collision induced dissociation portion, making it possible to obtain a three-dimensional spectrum.

Second Embodiment

A configuration of an apparatus according to a second embodiment is the same as the first embodiment and therefore, the description thereof will be omitted.

Figure 9:
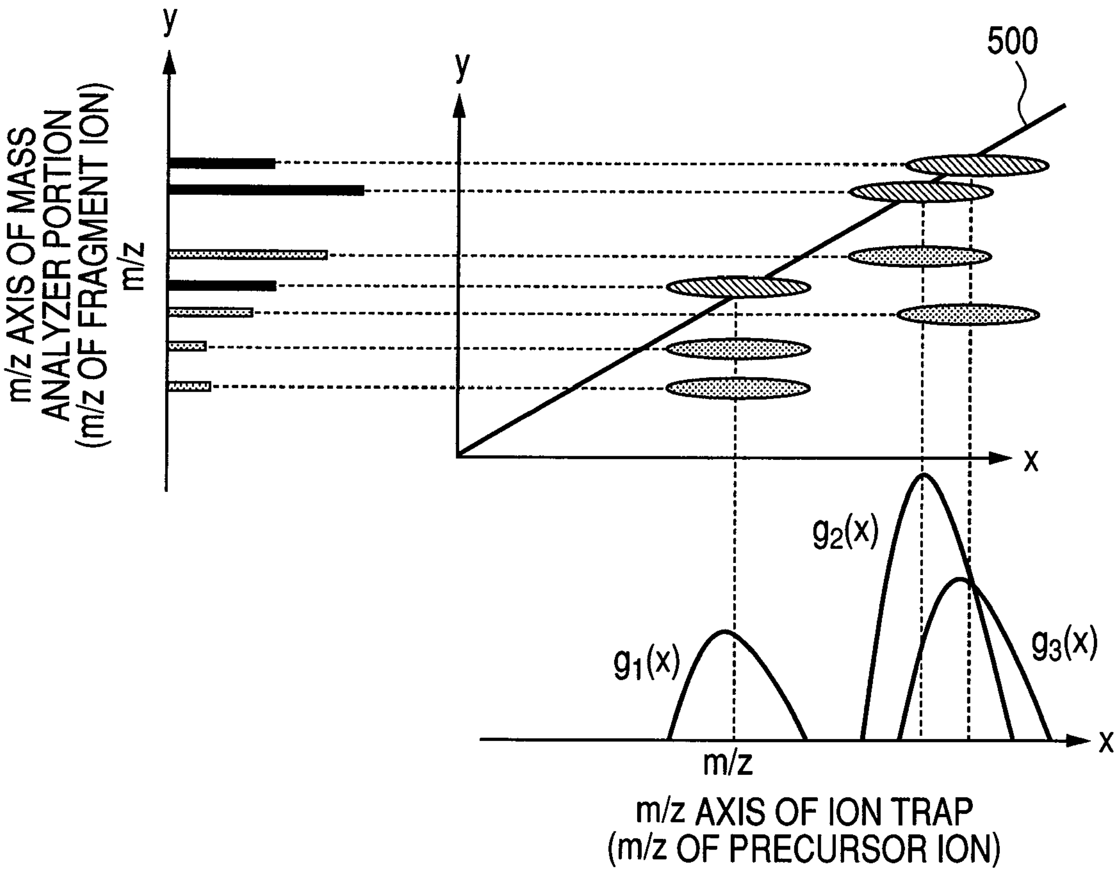
FIG. 9 is a diagram for explaining an effect of a second embodiment according to the present invention.

In the second embodiment 2, the 2D mass spectrum obtained by changing the difference of the offset potential between the ion trap unit and the collision induced dissociation portion each time the ion trap unit is scanned 1 to 10 times is integrated about 10 to 400 times. The difference of the offset potential of the collision induced dissociation portion is changed within the range of about 0 V to about 100 V so that the precursor ions include the dissociation condition and the non-dissociation condition. At this time, a pattern diagram of the 2D mass spectrum viewed from an axis (z-axis) direction of ion intensity is shown in FIG. 9. In FIG. 9, the projection components to each of the x-axis and y-axis are plotted at a lower side of the x-axis and a left side of the y-axis. The 2D mass spectrum includes the information on the spectra under the condition where the precursor ions are not dissociated as well as the information on the spectra under the condition where the precursor ions are dissociated. First, the precursor ions extract the information on the spectra under the non-dissociation condition. The mass of the precursor ions extracted from the ion trap unit is given by the equation 1. The ion signal carried on line 500 where the m/z obtained from equation 1 meets the m/z of the time-of-flight type mass analyzer portion is a signal under the condition where the precursor ions are not dissociated. To the contrary, the signal not carried on line 500 where the m/z obtained from equation 1 meets the m/z of the time-of-flight type mass analyzer portion is a signal under the condition where the precursor ions are not dissociated. Thereby, the signal of the condition where the precursor ions are dissociated and the signal of the condition where the precursor ions are not dissociated can be separated from each other. Further, when the m/z of the precursor ions and the fragment ions approaches each other, the return precision of the precursor ions can be improved by using the matched information on the profile at the m/z axis of the ion trap with the information on the profile at the mass analyzer portion. The process after separating the signal of the condition where the precursor ions are dissociated and the signal of the condition where the precursor ions are not dissociated is the same as the first embodiment and therefore, the description thereof will be omitted.

Since the second embodiment acquires one sheet of the 2D mass spectrum by meeting the condition where the precursor ions are dissociated and the condition where the precursor ions are not dissociated, it can perform the measurement faster than the first embodiment. Further, even when the injection energy suitable for the collision induced dissociation of the precursor ions cannot be estimated in advance, the ions can be dissociated. This is particularly effective for a case where the ions introduced into the mass spectrometer are changed over time, by a combination with a liquid chromatography, etc. However, the information on injection energy, such as which precursor ions are dissociated by some injection energy, cannot be obtained. Further, since the first embodiment uses more the number of times of measuring the spectra for each injection energy, the S/N of the obtained 2D mass spectrum becomes better in the first embodiment.

If the ion trap unit used in the present invention can extract the trapped ions mass-selectively, any ion traps other than those described in the first and second embodiments can be used. Further, the collision induced dissociation portion can use a multipole such as 8 poles, 16 poles and the like. Moreover, other than the mass spectrometers described in the first and second embodiments, any high-resolution mass spectrometers, which can measure the ion intensity by sorting the mass using FT-ICR and the like, can be used. Further, instead of the collision induced dissociation portion, the electron capture dissociation portion can also be used. In this case, the injection energy of ions to the collision induced dissociation portion is not controlled but the injection energy of electrons to the electron capture dissociation portion is controlled.

What is claimed is:

1. A mass spectrometer comprising:

an ion trap unit that extracts precursor ions within a predetermined mass range;

a dissociation unit that is arranged in a subsequent stage of the ion trap unit and dissociates the precursor ions;

a mass analyzer portion that is arranged in the subsequent stage of the dissociation unit and performs a mass analysis of the precursor ions or fragment ions generated by dissociating the precursor ions; and a controller including a profile substituting unit that is connected to the mass analyzer portion and substitutes a profile of the precursor ions at a mass-to-charge ratio m/z axis of the ion trap into a profile of the precursor ions at a m/z axis of the mass analyzer portion, in a 2D mass spectrum.

2. The mass spectrometer according to claim 1, wherein the mass analyzer portion performs the measurement under a first condition where the precursor ions are substantially dissociated in the dissociation unit and a second condition different from the first condition.

3. The mass spectrometer according to claim 2, wherein the profile substituting unit substitutes the profile of the precursor ions at the m/z axis of the ion trap of the 2D mass spectrum obtained by the measurement under the first condition with the profile of the precursor ions at the m/z axis of the mass analyzer portion of the 2D mass spectrum obtained by the measurement under the second condition.

4. The mass spectrometer according to claim 1, wherein the controller includes a separating unit that separates a signal of the first condition and a signal of the second condition from the 2D mass spectrum that includes the spectra of the first condition and the spectra of the second condition.

5. The mass spectrometer according to claim 1, wherein the dissociation unit is a collision induced dissociation portion that dissociates the precursor ions by the collision induced dissociation.

6. The mass spectrometer according to claim 5, wherein the controller includes a voltage controller that makes the precursor ions incident to the collision induced dissociation portion under the plurality of conditions having different injection energy.

7. The mass spectrometer according to claim 6, wherein the injection energy of the precursor ions to the collision induced dissociation portion includes the first condition and the second condition.

8. The mass spectrometer according to claim 1, wherein the dissociation unit is an electron capture dissociation portion that dissociates the precursor ions by electron capture dissociation.

9. A mass spectrometric analysis method comprising:

extracting precursor ions within a predetermined mass range accumulated in an ion trap unit;

introducing the precursor ions extracted from the ion trap unit into the dissociation unit;

measuring the precursor ions extracted from the dissociation unit and fragment ions generated by dissociating the precursor ions in the dissociation unit by a mass analyzer portion; and substituting a profile of the precursor ions at the mass-to-charge ratio m/z axis of the ion trap of a 2D mass spectrum obtained by a first condition where the precursor ions are substantially dissociated with a profile of the precursor ions at the m/z axis of the mass analyzer portion of the 2D mass spectrum obtained by a second condition different from the first condition.

10. The mass spectrometric analysis method according to claim 9, further comprising measuring so that the dissociation unit includes the first condition and the second condition; and separating a signal of the first condition and a signal of the second condition from the 2D mass spectrum that includes the spectra of the first condition and the spectra of the second condition.

11. The mass spectrometric analysis method according to claim 9, wherein the dissociation unit is a collision induced dissociation portion that dissociates the precursor ions by the collision induced dissociation.

12. The mass spectrometric analysis method according to claim 11, wherein the precursor ions are introduced into the collision induced dissociation portion under the plurality of conditions having different injection energy.

13. The mass spectrometric analysis method according to claim 12, wherein the injection energy of the precursor ions to the collision induced dissociation portion includes the first condition and the second condition.

14. The mass spectrometric analysis method according to claim 9, wherein the dissociation unit is an electron capture dissociation portion that dissociates the precursor ions by electron capture dissociation.

* * * * *